(12) United States Patent
Millican

(10) Patent No.: US 12,165,482 B2
(45) Date of Patent: Dec. 10, 2024

(54) MOBILE PERSONAL-SAFETY APPARATUS

(71) Applicant: Ruth Nicola Millican, Hong Kong (CN)

(72) Inventor: Ruth Nicola Millican, Hong Kong (CN)

( * ) Notice: Subject to any disclaimer, the term of this patent is extended or adjusted under 35 U.S.C. 154(b) by 159 days.

(21) Appl. No.: 17/430,501

(22) PCT Filed: Feb. 14, 2020

(86) PCT No.: PCT/CN2020/075241
§ 371 (c)(1),
(2) Date: Aug. 12, 2021

(87) PCT Pub. No.: WO2020/164583
PCT Pub. Date: Aug. 20, 2020

(65) Prior Publication Data
US 2022/0139204 A1    May 5, 2022

(30) Foreign Application Priority Data

Feb. 14, 2019 (HK) .................................. 19119426.5

(51) Int. Cl.
*G08B 25/01* (2006.01)
*G06V 20/52* (2022.01)
(Continued)

(52) U.S. Cl.
CPC .......... *G08B 25/016* (2013.01); *G06V 20/52* (2022.01); *G06V 40/10* (2022.01); *G08B 19/00* (2013.01);
(Continued)

(58) Field of Classification Search
CPC ...... G08B 25/016; G08B 19/00; G08B 25/12; G08B 21/0476; G08B 21/0446;
(Continued)

(56) References Cited

U.S. PATENT DOCUMENTS 10,551,889 B2 * 2/2020 Ashwood ............... H04B 1/036
11,172,101 B1 * 11/2021 Boozer .................. H04N 23/57
(Continued)

FOREIGN PATENT DOCUMENTS

WO    WO-2017085743 A2 *  5/2017

*Primary Examiner* — James J Yang
(74) *Attorney, Agent, or Firm* — Edwin De Angel

(57) ABSTRACT

A wearable apparatus for personal safety has a scene monitor for sensing an ambient environment, and a main controller for processing the scene data. An emergency condition adverse to a user is detected by processing captured images of the ambient environment to determine whether a violent movement signifying the user facing an attack or accident has occurred. Motion data measured by a motion sensor in the apparatus can be used, alone or with captured images, to assist this determination. Upon detection of the emergency condition, the apparatus automatically sends scene data most-recently obtained before the emergency condition occurs to a remote server for securely storing these scene data for future uses even if the apparatus is subsequently damaged by, e. g., an attacker. The sending of scene data is automatic without a need for the user to initiate. Microphone, hazardous-gas sensor, etc. may also be used in sensing the ambient environment.

18 Claims, 5 Drawing Sheets

(51) Int. Cl.
*G06V 40/10* (2022.01)
*G08B 19/00* (2006.01)
*G08B 25/12* (2006.01)
*H04N 23/68* (2023.01)
*H04W 4/029* (2018.01)
*H04W 4/80* (2018.01)
*H04W 4/90* (2018.01)

(52) U.S. Cl.
CPC ......... *G08B 25/12* (2013.01); *H04N 23/6812* (2023.01); *H04W 4/029* (2018.02); *H04W 4/80* (2018.02); *H04W 4/90* (2018.02)

(58) Field of Classification Search
CPC ........ G06V 20/52; G06V 40/10; G06V 40/23; H04N 23/6812; H04N 23/661; H04W 4/029; H04W 4/80; H04W 4/90
See application file for complete search history.

(56) References Cited

U.S. PATENT DOCUMENTS

| | | | | |
|---|---|---|---|---|
| 2013/0119255 | A1* | 5/2013 | Dickinson | G04G 21/02 |
| | | | | 250/206 |
| 2014/0299783 | A1* | 10/2014 | Valentino | G01J 1/0219 |
| | | | | 250/336.1 |
| 2014/0348484 | A1* | 11/2014 | Erwin | A42B 3/042 |
| | | | | 386/223 |
| 2015/0065055 | A1* | 3/2015 | Newham | H04W 52/0251 |
| | | | | 455/41.3 |
| 2016/0044276 | A1* | 2/2016 | Shearman | A42B 3/042 |
| | | | | 348/207.1 |
| 2017/0193306 | A1* | 7/2017 | Robil | H04M 1/72457 |
| 2017/0318146 | A1* | 11/2017 | Peter | H04M 1/72436 |
| 2019/0213429 | A1* | 7/2019 | Sicconi | G06F 3/012 |

* cited by examiner

MOBILE PERSONAL-SAFETY APPARATUS

CROSS-REFERENCE TO RELATED APPLICATIONS

This application claims priority to Hong Kong Short-Term Patent Application No. 19119426.5, filed on Feb. 14, 2019, the disclosure of which is incorporated by reference herein.

LIST OF ABBREVIATIONS

AI Artificial intelligence
BLE Bluetooth Low Energy
GPS Global Positioning System
IR Infrared
LTE Long Term Evolution
PM Particulate matter
SMS Short message service
UV Ultraviolet

FIELD OF THE INVENTION

The present disclosure relates to a personal-safety apparatus, and more particularly to a mobile personal-safety apparatus wearable by a user.

BACKGROUND

When a person is working, studying, commuting, taking public transport, using taxi, enjoying sports or other general activities in open spaces such as streets, roads or the country side, the person comes into contact with the general public. There are occasions that the person is likely to be attacked, harassed and generally made to feel unsafe in his or her environment by other people, or to be subject to accidents or emergencies. It is desirable to have a system or a device enabling the person to feel safer in such adverse circumstances.

U.S. Pat. No. 9,177,455B2 discloses a personal safety system having an electronic device for capturing images and audios of an environment nearby a user, and a smartphone for receiving the captured data from the electronic device and relaying the data to a secure and remote storage location. The electronic device is wearable by the user. The stored data can be used in the future as, for instance, evidence of an attacker attacking the user even if the electronic device is subsequently destroyed by the attacker. However, the smartphone can be removed and destroyed by the attacker. Furthermore, the user is required to switch on the electronic device when the user is being attacked or feels that he or she is likely to be attacked. One shortcoming is that the user may not be able to switch on the electronic device, especially when he or she is under attack. It is desirable if there is an automatic switching-on mechanism for the electronic device. Another shortcoming is that a pre-recording of the scene prior to the attack is not possible unless he or she is aware of the forthcoming danger. The scene prior to the attack may be valuable evidence to the police in investigating the attack. It is also desirable if recording of the scene prior to the attack is possible.

U.S. Pat. No. 6,784,833B1 discloses a personal surveillance system wearable by a user but image recording made by the system is triggered by a remote party, not automatically. U.S. Pat. No. 5,594,498A discloses a personal audio/video surveillance system triggered to record images and audios by the user, also not automatically, although the recorded images and audios are instantly transmitted to a remote location. US 2015/0316979A1 discloses a wearable camera system in which image recording is also manually triggered by the user. JP 2006285749A discloses a schoolbag installed with a camera for continuously taking photographs to a student's surrounding and transmitting the photographs remotely to the student's parents through a mobile communication network. In case of an attack happened to the student, the photographs before the attack are available at the expense of large battery-power consumption spent in continuously transmitting the video to a remote location. Automatic triggering of image recording in case of danger is useful for battery power saving.

There is a need in the art for a personal safety system or apparatus having at least the functionality of detecting a threat to a user and hence automatically sensing an ambient environment of the user. It is also preferable if the system or apparatus has an additional functionality of recording the ambient environment before the threat is detected without putting a heavy burden on the required battery power.

SUMMARY OF THE INVENTION

The present disclosure provides a mobile personal-safety apparatus.

The apparatus is wearable by a user. The apparatus comprises a scene monitor and a main controller. The scene monitor is used for sensing an ambient environment of the user to yield scene data. The main controller is used for controlling the scene monitor and processing the scene data received therefrom. The main controller comprises a transceiver and a processor. The transceiver is used for performing wireless communication. The processor is configured to, responsive to detecting occurrence of an emergency condition adverse to the user, configure the transceiver to transmit a first plurality of scene data most-recently obtained over a predetermined length of time to a remote server for securely storing the first plurality of scene data in the remote server. It follows that the scene data obtained immediately before the emergency condition occurs are available for future uses even if the apparatus is subsequently tampered or damaged. In addition, the processor is further configured to detect occurrence of the emergency condition. Occurrence of the emergency condition being detected causes a transmission of the first plurality of scene data to the remote server to be automatically initiated without a need for the user to initiate the transmission.

Preferably, the processor is further configured such that responsive to detecting occurrence of the emergency condition, the processor configures the transceiver to transmit a second plurality of scene data obtained after the emergency condition is detected for securely storing the second plurality of scene data in the remote server for future uses even if the apparatus is subsequently tampered or damaged.

In some embodiments, the apparatus further comprises a motion sensor for detecting motion of the user to yield motion data. The motion sensor may be selected from a three-axis accelerometer, a gyroscope, or a combination thereof. The processor is configured as follows. The processor processes the motion data to determine whether a violent movement signifying the user facing a physical attack or an accident has occurred in order to detect occurrence of the emergency condition. Responsive to detecting occurrence of the violent movement, the processor identifies that the emergency condition has occurred, thereby causing a transmission of the first plurality of scene data to the remote server to be automatically initiated without a need for the user to initiate the transmission.

In some embodiments, the scene monitor comprises a camera for capturing images of the ambient environment. The scene data include the captured images.

In some embodiments, the processor is configured to process the captured images to determine whether a violent movement signifying the user facing a physical attack or an accident has occurred in order to detect occurrence of the emergency condition. The violent movement being determined to have occurred causes occurrence of the emergency condition to be detected, thereby causing a transmission of the first plurality of scene data to the remote server to be automatically initiated without a need for the user to initiate the transmission.

In some embodiments, the motion data are used with the captured images for detecting occurrence of the violent movement. The processor is configured as follows. The processor processes the motion data to give a second decision of whether the violent movement has occurred. The processor combines the second decision with a first decision to yield a final decision of whether the violent movement has occurred, where the first decision is obtained by processing the captured images to determine whether the violent movement has occurred.

In some embodiments, the processor is configured to process the captured images to determine whether a predetermined hazardous object is present in the ambient environment in order to detect occurrence of the emergency condition. The predetermined hazardous object may be selected from a fire, one or more predetermined types of weapon, one or more known felons, and individuals who are considered dangerous by, e.g., the user. Responsive to detecting presence of the predetermined hazardous object, the processor identifies that the emergency condition has occurred, thereby causing a transmission of the first plurality of scene data to the remote server to be automatically initiated without a need for the user to initiate the transmission.

It is preferable that the processor is configured as follows. In an absence of the emergency condition being detected, the processor controls the camera to periodically capture still images of the ambient environment. Responsive to detecting occurrence of the emergency condition, the processor controls the camera to take a video, or a series of snap shots, of the ambient environment in real time. The processor configures the transceiver to transmit the video or the series of snap shots to the remote server for securely storing the video in the remote server for future uses even if the apparatus is subsequently tampered or damaged.

In some embodiments, the scene monitor comprises a microphone for capturing audio signals originated from the ambient environment, whereby the scene data further include the captured audio signals. Optionally, the processor is configured to process the captured audio signals to determine whether a predetermined danger-indicative sound segment is present in the ambient environment in order to detect occurrence of the emergency condition. The predetermined danger-indicative sound segment may be selected from a gunshot, an explosion, a scream, a siren, and one or more predetermined spoken words related to danger. Responsive to detecting presence of the predetermined danger-indicative sound segment, the processor identifies that the emergency condition has occurred, thereby causing a transmission of the first plurality of scene data to the remote server to be automatically initiated without a need for the user to initiate the transmission.

In some embodiments, the processor is configured as follows. The processor detects an unexpected stop of transmission of the scene data from the scene monitor to the main controller in order to detect occurrence of the emergency condition. Responsive to detecting the unexpected stop of scene-data transmission, the processor identifies that the emergency condition has occurred. As a result, it causes a transmission of the first plurality of scene data to the remote server to be automatically initiated without a need for the user to initiate the transmission.

In some embodiments, the scene monitor comprises a hazardous-gas sensor for measuring a concentration of a predetermined hazardous gas to yield hazardous-gas concentration data. Optionally, the processor is configured to process the hazardous-gas concentration data to detect occurrence of the emergency condition. Occurrence of the emergency condition being detected causes a transmission of the first plurality of scene data to the remote server to be automatically initiated without a need for the user to initiate the transmission.

In some embodiments, the scene monitor comprises a PM measurement sensor for measuring a concentration of PM to yield PM concentration data. Optionally, the processor is configured to process the PM concentration data to detect occurrence of the emergency condition. Occurrence of the emergency condition being detected causes a transmission of the first plurality of scene data to the remote server to be automatically initiated without a need for the user to initiate the transmission.

In some embodiments, the scene monitor comprises an ionizing radiation sensor for measuring radiation power of ionizing radiation to yield radiation-power data. Optionally, the processor is configured to process the radiation-power data to detect occurrence of the emergency condition. Occurrence of the emergency condition being detected causes a transmission of the first plurality of scene data to the remote server to be automatically initiated without a need for the user to initiate the transmission.

In some embodiments, the scene monitor or the main controller comprises a GPS tracking unit for identifying a location of the apparatus to yield location data. The scene data further include the location data.

The transceiver may be configured to at least support one or more terrestrial mobile communication protocols in providing wireless connectivity with the remote server. The transceiver may also be configured to at least support WiFi in providing wireless connectivity with the remote server. It is also possible that the transceiver is configured to at least support BLE protocol in providing wireless connectivity with the remote server.

In general, the main controller further comprises a memory for storing the scene data. The processor is configured to store the scene data in the memory.

Preferably, the apparatus further comprises a cable connecting the scene monitor and the main controller for at least enabling the scene monitor and the main controller to communicate. It allows the scene monitor to be exposed outside a garment of the user for sensing the ambient environment while the main controller is concealed inside the garment, thereby hindering an attacker who attacks the user from forcibly taking hold of the main controller.

The main controller may further comprise a battery holder for accommodating a battery. Alternatively, the main controller may further comprise a built-in battery for powering the apparatus. In both cases, the cable is configured to transmit electrical power from the battery to the scene monitor for powering the scene monitor.

It is preferable that the apparatus further comprises an attachment device attached to the scene monitor for detachably attaching the scene monitor to a garment of the user.

In some embodiments, the processor is configured as follows. The processor configures the transceiver to communicate with a mobile computing device for receiving commands therefrom. The processor executes the received commands.

In some embodiments, the apparatus comprises an emergency button for enabling the user to manually inform the processor that an emergency condition has occurred.

In some embodiments, the main controller comprises a power button for enabling the user to manually switch on and off the apparatus. The processor is configured as follows. In response to detecting occurrence of the emergency condition, the power button is temporarily inactivated so as to disable switching off the apparatus at least until the processor receives a message from the remote server that the remote server has successfully received the first plurality of scene data. It thereby hinders an attacker who attacks the user from forcibly stopping transmission of the first-plurality of scene data to the remote server.

Other aspects of the present invention are disclosed as illustrated by the embodiments hereinafter.

DETAILED DESCRIPTION

The following definitions are used herein in the specification and the appended claims. "A cloud" or "computing cloud" is interpreted in the sense of cloud computing or, synonymously, distributed computing over a network unless otherwise specified. "A server" is interpreted in the sense of computing. That is, a server is a computing server. A server is usually equipped with one or more (computing) processors for executing program instructions, and one or more storages for storing data. A server may be a standalone computing server (i.e. a physical server), a distributed server in the cloud, or a virtual server for handling clients' instructions. The one or more storages may be, for example, hard disks or solid-state disk drives. "A mobile computing device" is a portable electronic device having computing power and configured to be used by a human user. For example, a mobile computing device may be a smartphone or a handheld tablet computer.

Figure 1:
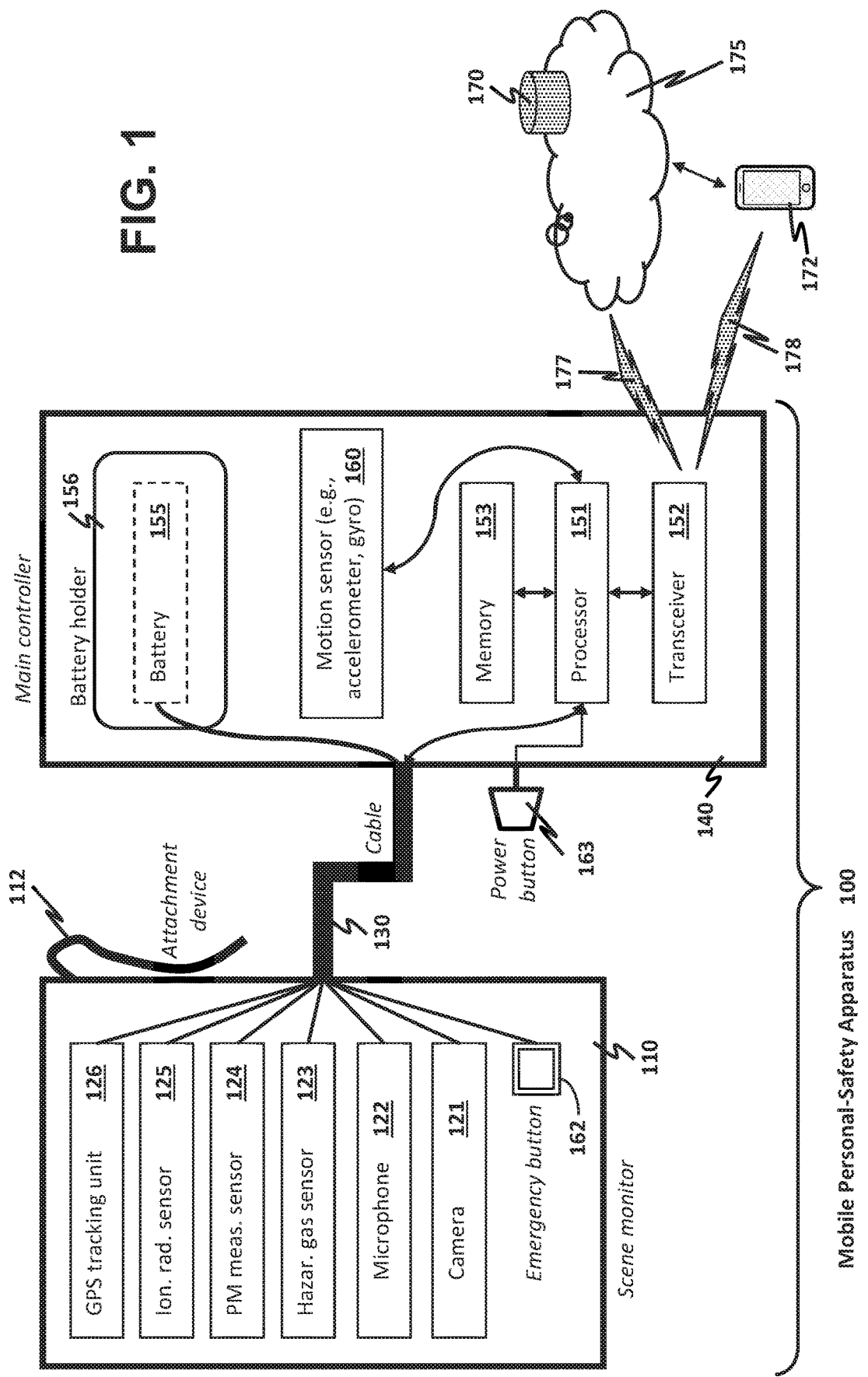
FIG. 1 depicts an exemplary mobile personal-safety apparatus, which has a scene monitor for sensing an ambient environment of a user, and a main controller for controlling the scene monitor and processing scene data received therefrom.

Disclosed herein is a mobile personal-safety apparatus configured to sense an ambient environment of a user to generate scene data, to detect occurrence of an emergency condition adverse to the user, and to automatically send the scene data immediately obtained before the emergency condition to a remote server for safe-keeping. For illustrating the disclosed apparatus, FIG. 1 depicts an exemplary mobile personal-safety apparatus 100.

The apparatus 100 is wearable by the user, and comprises a scene monitor 110 and a main controller 140. The scene monitor 110 is used for sensing an ambient environment of the user to yield scene data. The main controller 140 is used for controlling the scene monitor 110 and processing the scene data received from the scene monitor 110. The main controller 140 comprises a transceiver 152 and a processor 151. The transceiver 152 is used for performing wireless communication between the apparatus 100 and elsewhere external to the apparatus 100. The transceiver 152 is controllable by the processor 151. In particular, the processor 151 is configured to (1) detect occurrence of an emergency condition adverse to the user, and (2) upon detection of occurrence of the emergency condition, configure the transceiver 152 to transmit a first plurality of scene data most-recently obtained over a predetermined length of time to a remote server 170 for securely storing the first plurality of scene data in the remote server 170 for future uses even if the apparatus 100 is subsequently tampered or damaged, e.g., by an attacker who attacks the user. The first plurality of scene data contains the scene data recorded immediately before the emergency condition occurs, and thus provides evidential information about pre-occurrence of the emergency condition. Those skilled in the art may determine the predetermined length of time by considering how much evidential information is required to understand the ambient environment leading to the occurrence of the emergency condition. For example, one to five minutes may be sufficient in some practical situations.

Apart from the first plurality of scene data, the scene data obtained after the emergency condition is detected are also important because such scene data record the ambient environment when the user is exposed to a dangerous situation. Preferably and advantageously, the processor 151 controls the scene monitor 110 to continue sensing the ambient environment after the emergency condition is detected. In addition, the processor 151 configures the transceiver 152 to transmit a second plurality of scene data obtained after the emergency condition is detected for securely storing the second plurality of scene data in the remote server 170 for future uses even if the apparatus 100 is subsequently tampered or damaged.

The scene monitor 110 is equipped with one or more sensors for sensing the ambient environment.

In some embodiments, the scene monitor 110 is installed with a camera 121, or a plurality of cameras, for capturing images of the ambient environment. The scene data therefore include the captured images. Optionally, the processor 151 is configured to determine whether a violent movement signifying the user facing a physical attack or an accident has occurred in order to detect occurrence of the emergency condition. Whether the violent movement has occurred is determined by processing the captured images. If it is determined that the violent movement has occurred, occurrence of the emergency condition is detected or confirmed. The detection or confirmation of occurrence of the emergency condition causes the apparatus 100 to automatically initiate a transmission of the first plurality of scene data to the remote server 170 for safe-keeping without a need for the user to initiate the transmission. Practically, the violent movement is usually detected by estimating an amount of shake, or a change of speed, made to the camera 121 from successively captured images. The amount of shake and the change of speed can be determined according to the teachings in the art, e.g., the algorithms disclosed in US 2011/0310262A1, U.S. Pat. No. 9,888,180B2 and U.S. Pat. No. 9,973,698B2. The violent movement is determined if the amount of shake is excessive, or if the change of speed is large and abrupt. Since the violent movement is a result of the user facing the physical attack or the accident, those skilled in the art may conduct routine experiments to determine the amount of shake and/or the change of speed in determining occurrence of the violent movement. The processor 151 may also detect the violent movement by detecting an abnormal behavior of the user. When there is a struggle between the user and an attacker, the user usually makes a series of movements, such as being pushed, shaken, hit, etc., in a short time. All these movements may be detected as not normal behavior for the user to do, thus identifying occurrence of the emergency condition.

It is observed that before the emergency condition is detected, it is usually not required to continuously take a video of the ambient environment in order to save battery power of the apparatus 100. It is reasonable to periodically capture images of the ambient environment, e.g., taking 4 to 8 snapshots per second, while also collecting audio data and other scene data captured via the scene monitor 110. After the emergency condition is detected, it is advantageous to take a video, or a series of snap shots, for collecting more details on the ambient environment. Preferably, the processor is further configured to perform the following tasks. In an absence of the emergency condition being detected, the processor 151 controls the camera 121 to periodically capture still images of the ambient environment. In response to detecting occurrence of the emergency condition, the processor 151 controls the camera 121 to take a video, or a series of snap shots, of the ambient environment in real time. The processor 151 further configures the transceiver 152 to transmit the video or the series of snap shots to the remote server 170 for securely storing the video in the remote server 170 for future uses even if the apparatus 100 is subsequently tampered or damaged. The scene data are stored in a memory 153 of the main controller 140, until such a time as it is removed by the user, or the main controller 140 is notified by the remote server 170 that the data have been successfully and safely received and stored.

The determination of whether the violent movement has occurred may be aided by a mechanical device configured to detect motion of the apparatus 100. Optionally, the apparatus 100 further comprises a motion sensor 160 for detecting motion of the user to yield motion data. Practically, the motion sensor 160 is usually realized as a three-axis accelerometer, a gyroscope, or a combination thereof. Preferably, the processor 151 is further configured to process the motion data to give a second decision of whether the violent movement has occurred so as to combine with a first decision made by processing the captured images on determining whether the violent movement has occurred. The combining of the first and second decisions to give a final decision of whether the violent movement has occurred may be implemented as follows. In one option, the final decision is made if the processor 151 finds that both the captured images and the motion data indicate occurrence of the violent movement. Using this option reduces the likelihood of false alarm. In another option, the final decision is made if either the captured images or the motion data indicate occurrence of the violent movement. Using this option reduces the likelihood of miss. It is also possible to develop an algorithm to make the final decision such that the likelihood of miss is minimized under a given likelihood of false alarm.

Alternatively, the processor 151 may process the motion data alone to detect occurrence of the violent movement without processing the captured images for such detection. Since the motion sensor 160 directly outputs the motion data, it is less computationally intensive for the processor 151 to process the motion data in detecting the violent movement in comparison to making the detection through processing the captured images, thus leading to a saving in battery power.

The motion sensor 160 may be located in the main controller 140 (as shown in FIG. 1). Alternatively, the motion sensor 160 may also be included in the scene monitor 110 (not shown in FIG. 1) as one of the sensors for sensing the ambient environment. As a result, the scene data further include the motion data.

Apart from detecting occurrence of the emergency condition through identifying the violent movement from the captured images, the emergency condition may also be detected by independently identifying other events. In some embodiments, the processor 151 is configured to process the captured images to determine whether a predetermined hazardous object is present in the ambient environment in order to detect occurrence of the emergency condition. If it is determined that the predetermined hazardous object is present, occurrence of the emergency condition is detected. It causes the processor 151 to execute a preset procedure, which includes the delivery of the first plurality of scene data to the remote server 170, in response to occurrence of the emergency condition. Examples of hazardous object include a fire, a certain type of weapon, and a known felon. Generally, the detection of the predetermined hazardous object from the captured images is achieved by running object recognition algorithms in the processor 151. The object recognition algorithms are readily available in the art, e.g., U.S. Pat. No. 6,763,148B1 and US 2019/0318195A1. In case of detecting the fire, the detection problem is simplified by detecting a large number of very bright pixels on a captured image. See U.S. Pat. No. 7,542,585B2 for a related algorithm. In case of identifying the known felon, a facial recognition algorithm, e.g., the one disclosed in U.S. Pat. No. 7,643,671B2, may be used.

Apart from the camera 121, other sensors may be used to sense the ambient environment. Furthermore, pluralities of scene data respectively generated from these sensors and the camera 121 may be individually and independently used to identify occurrence of the emergency condition. The processor 151 may also be configured to select scene data only generated from a subset of all sensors in the apparatus 100 for identifying occurrence of the emergency condition.

In some embodiments, the scene monitor 110 is installed with a microphone 122, or a plurality of microphones, for capturing audio signals originated from the ambient environment. As a consequence, the scene data include the captured audio signals. Optionally, the processor 151 is configured to process the captured audio signals to determine whether a predetermined danger-indicative sound segment is present in the ambient environment in order to detect occurrence of the emergency condition. If the predetermined danger-indicative sound segment is determined to be present, the emergency condition is identified, thereby at least causing a transmission of the first plurality of scene data to the remote server 170 to be automatically initiated without a need for the user to initiate the transmission. Examples of danger-indicative sound segment include a gunshot, an explosion, a scream, a siren, and one or more predetermined spoken words related to danger. Such spoken words may be "gun," "help" and "I'm shot."

In some embodiments, the scene monitor 110 is installed with a hazardous-gas sensor 123, or a plurality of hazardous-gas sensors, for measuring a concentration of a predetermined hazardous gas to yield hazardous-gas concentration data. Typical examples of hazardous gas include carbon monoxide and hydrogen cyanide. Optionally, the processor 151 is configured to process the hazardous-gas concentration data to detect occurrence of the emergency condition. If the hazardous-gas concentration data reveals that the concentration of the predetermined hazardous gas exceeds a certain predetermined concentration, the emergency condition is identified, thereby at least causing a transmission of the first plurality of scene data to the remote server 170 to be automatically initiated without a need for the user to initiate the transmission.

In some embodiments, the scene monitor 110 is installed with a PM measurement sensor 124, or a plurality of PM measurement sensors, for measuring a concentration of PM in the ambient environment to yield PM concentration data. Portable PM measurement sensors are available in the art, e.g., the ones disclosed in US 2009/0056416A1 and U.S. Pat. No. 9,995,667B2. Optionally, the processor 151 is configured to process the PM concentration data to detect occurrence of the emergency condition. If the PM concentration data reveals that the concentration of the PM exceeds a certain predetermined concentration, the emergency condition is identified, thereby at least causing a transmission of the first plurality of scene data to the remote server 170 to be automatically initiated without a need for the user to initiate the transmission.

In some embodiments, the scene monitor 110 is installed with an ionizing radiation sensor 125, or a plurality of ionizing radiation sensors, for measuring radiation power of ionizing radiation to yield radiation-power data. The ionizing radiation is usually emitted by a radioactive substance, causing danger to the user. Portable ionizing radiation sensors are available in the art, e.g., the ones disclosed U.S. Pat. No. 8,466,425B2 and WO 2015/026261A1. Optionally, the processor 151 is configured to process the radiation-power data to detect occurrence of the emergency condition. If the radiation-power data reveals that the level of measured ionizing radiation exceeds a certain predetermined level, the emergency condition is identified, thereby at least causing a transmission of the first plurality of scene data to the remote server 170 to be automatically initiated without a need for the user to initiate the transmission.

Other sensors that may be useful to be installed in the scene monitor 110 include an IR camera and a UV sensor. The IR camera is especially useful for capturing a scene of the ambient environment at night. The IR camera can also be used for thermal imaging. Thermal imaging may be advantageously used for identifying fire, or identifying nearby people who have a fever. The UV sensor enables the apparatus 100 to raise alarm in case of high UV radiation level.

Apart from using various sensors to detect occurrence of the emergency condition, it is also possible to detect its occurrence by checking if the scene data are properly received during normal operation. An unexpected stop of transmission of the scene data from the scene monitor 110 to the main controller 140 is indicative to possible happening of adverse events, such as a robber robbing the user and trying to destroy the scene monitor 110. In some embodiments, the processor 151 is configured to monitor transmission of the scene data from the scene monitor 110 to the main controller 140, and to detect an unexpected stop of scene-data transmission. In case the unexpected stop is detected, the processor 151 identifies that the emergency condition has occurred. It triggers an automatic transmission of the first plurality of scene data to the remote server 170 without a need for the user to initiate this transmission.

In practical use of the apparatus 100, the user wears the apparatus 100 on the user's garment. The scene monitor 110 is positioned outside the garment so as to sense the ambient environment. Preferably, the scene monitor 110 has a casing that is waterproof, for example, a waterproof casing made of hard plastic. On the other hand, the main controller 140 is usually concealed inside the garment in order to resist a malicious person from grabbing the main controller 140.

Preferably and advantageously, the apparatus 100 further comprises a cable 130 connecting the scene monitor 110 and the main controller 140 for at least enabling the scene monitor 110 and the main controller 140 to communicate. It allows the scene monitor 110 to be exposed outside the garment for sensing the ambient environment while the main controller 140 is concealed inside the garment to thereby hinder or delay an attacker who attacks the user from forcibly taking hold of or destroying the main controller 140.

The cable 130 also provides mechanical connection between the scene monitor 110 and the main controller 140 and optionally serves other functions, e.g., supplying electrical power from the main controller 140 to the scene monitor 110. In some embodiments, the main controller 140 further comprises a battery holder 156 for accommodating a battery 155. The battery 155 is a replaceable battery. The cable 130 is configured to transmit electrical power from the battery 155 to the scene monitor 110 for powering the scene monitor 110. In some embodiments, the battery 155 is a built-in battery and is rechargeable. The battery 155 is installed inside the main controller 140 for powering the apparatus 100. Similarly, the cable 130 is configured to transmit electrical power from the battery 155 to the scene monitor 110 for powering the scene monitor 110.

As the battery 155 is not housed in the scene monitor 110, which is attached to an exterior part of the garment, the scene monitor 110 can be realized as a lightweight small-size unit comfortable for the user to wear on the garment.

Apart from using the cable 130, another option of connecting the scene monitor 110 and the main controller 140 is to use a wireless communication link. However, the scene monitor 110 is required to be equipped with a transceiver for communicating with the main controller 140, and a power source independent of the battery 155 located in the main controller 140 for powering various sensors and circuits in the scene monitor 110.

For the convenience to the user, preferably the apparatus 100 further comprises an attachment device 112 attached to the scene monitor 110 for detachably attaching the scene monitor 110 to the garment of the user. The attachment device 112 may be a simple clip to clothing, a lanyard, or snap-attached on an arm-band, a leg band, a head band, a cap, a chest strap or other wearable article carriers. The attachment device 112 may include a Velcro band, a magnetic fastener or other snap attachment accessories.

It is sometimes useful to record locations of the user when he or she travels. In some embodiments, the scene monitor 110 or the main controller 140 is installed with a GPS tracking unit 126 for identifying a geographical location of the apparatus 100 to yield location data. The scene data further include the location data.

In general, the main controller 140 further comprises the memory 153 for storing the scene data received from the scene monitor 110. The processor 151 is configured to store the scene data in the memory 153. The memory 153 may be a volatile memory (such as a random-access memory module) or a non-volatile memory (such as a solid-state storage or a magnetic disk). Whether volatile or non-volatile memory is used can be determined by those skilled in the art according to the situation under consideration.

The processor 151 may be implemented as one single processing element or a group of processing elements networked together. A processing element may be a general purpose processor, a digital signal processor, a specialized processor (e.g., a processor specialized for image processing), a microcontroller, a programmable logic device, a field programmable gate array, etc. The processor 151 is configured or programmed according to the teachings of the present disclosure. Computer instructions or software codes running in the processor 151 can readily be prepared by practitioners skilled in the software or electronic art based on the teachings of the present disclosure.

The transceiver 152 is configured to support one or more communication protocols for enabling the apparatus 100 to communicate with an external device, such as the remote server 170. Usually, the remote server 170 is located in a computing cloud 175, and is addressable through the Internet. In some embodiments, the transceiver 152 is configured to at least support one or more terrestrial mobile communication protocols (e.g., LTE, 5G mobile communication standard, etc.). Wireless connectivity between the remote server 170 and the apparatus 100 is provided through a terrestrial mobile-communication link 177 and the computing cloud 175. In some embodiments, the transceiver 152 is configured to at least support one or more short-range communication protocols (such as BLE protocol, WiFi, etc.). As an example for illustration, the apparatus 100 is wirelessly communicable with a mobile computing device 172 on a wireless channel 178 by using WiFi. The mobile computing device 172, such as a smartphone, is usually accessible to the computing cloud 175. Wireless connectivity between the apparatus 100 and the remote server 170 is established via the wireless channel 178 and the mobile computing device 172.

Since the main controller 140 is usually concealed inside the user's garment during normal operation, controlling and configuring the apparatus 100 is not convenient to the user if he or she is required to take the main controller 140 out from the garment. Hence, it is desirable that the user can use a smartphone or a tablet computer to send configuration commands to the apparatus 100. Preferably, the processor 151 is configured to configure the transceiver 152 to communicate with an external mobile computing device (such as the mobile computing device 172) for receiving commands therefrom, and to execute the received commands. Commands from the smartphone or tablet may be provided using a short-range wireless protocol, e.g. Bluetooth, or configured over the air, via a mobile network connection and a cloud service.

The main controller 140 may be installed with a display screen (not shown in FIG. 1) for providing a user interface with the user.

The main controller 140 or the scene monitor 110 may be installed with an emergency button 162 for enabling the user to manually inform the processor 151 that an emergency condition has occurred.

For user convenience, the main controller 140 may be installed with a power button 163 for enabling the user to manually switch on and off the apparatus 100. However, the presence of the power button 163 provides an opportunity to an attacker who attacks the user to switch off the apparatus 100 in order to prevent the scene monitor 110 from sensing the ambient environment and/or to prevent the main controller 140 from relaying the scene data to the remote server 170 for safe-keeping. As a countermeasure, it is preferable and advantageous that the power button 163 is inactivated after occurrence of the emergency condition is detected. In particular, the processor 151 is configured such that when occurrence of the emergency condition is detected, the power button 163 is inactivated so as to disable switching off the apparatus 100. Preferably, the temporary inactivation of the power button 163 is maintained at least until the processor 151 receives a message from the remote server 170 that the remote server 170 has successfully received the first plurality of scene data. It thereby hinders the attacker from forcibly stopping the transmission of the first-plurality of scene data to the remote server 170. The temporary inactivation of the power button 163 may be maintained for a longer duration such that the scene monitor 110 continues to sense the ambient environment and the scene data obtained after the emergency condition is detected, i.e. the second plurality of scene data, are sent to the remote server 170.

To further illustrate the use of the disclosed mobile personal-safety apparatus, a practical realization of the apparatus 100 and a supporting platform for supporting a user who wears the apparatus 100 is described as follows.

Remote Data Storage

The scene data collected by the scene monitor 110 are to be stored outside of the apparatus 100 to mitigate risks of on-site or in-situ data destruction by a hostile party after an emergency or adverse incident has occurred. An adverse situation or incident may include bodily attacks, robbery, accident or other distress events. The collected scene data may be stored in the remote server 170 with a designated data storage account identified by an account name or identification. The designated account preferably is a cloud-based account and the data storage space is preferably cloud-based and is operated by a service provider. The service provider may operate a personal security service platform to provide customized services to registered users to provide personal security support. The platform may include predefined schemes or measures to react or counteract upon receipt of signals representing an emergency situation such as personal danger of a registered user. The platform may communicate continuously with the apparatus 100 and monitor signals originating from the apparatus 100 when the apparatus 100 is in a protection mode. When the platform is in receipt of signals from the apparatus 100 signifying occurrence of an emergency situation, the platform may react or counteract by reporting to the police or other responsible authorities and/or to contact with a person or persons pre-registered by the account user. For example, the person may be a next-of-kin or a family member. The platform on execution of stored instructions may also excerpt or extract information obtained from the scene data and provide the excerpted or extracted information to support rescue operations or to provide assistance. To have an external data storage account for access to the remote server 170, the user would need to set up a designated storage account with the platform when activating the apparatus 100 for the first time. To enable the platform to make contact with a desirable person in case of an emergency, the user when setting up the account or subsequently would need to input contact information of the contact person.

To mitigate risks of data destruction by a hostile party during or after an emergency or adverse incident has occurred, the files transmitted to the remote server 170 under Emergency Mode circumstances (or other modes at user's discretion) cannot be deleted even by the user for a period of time, for example, 72 hr. It stops the hostile party forcing the victim to give up any password protection set up in the system and deleting the files via web interface or mobile application. During this lock-down period, friends and family or the emergency services that have been set up in the system to access such files are able to view the data and act accordingly.

Modes of Operation

The mobile personal-safety apparatus 100 is operable in a plurality of operational modes and the main controller 140 is configured to operate in the plurality of operational modes on execution of stored instructions forming the "App".

Basic Mode (Eyes on)

Regardless of the instantaneous mode of operation in execution, the main controller 140 of the apparatus 100 during execution of pre-stored instructions of application software may always include an operation mode that is identified as the basic mode. In the basic mode, the main controller 140 is to operate to continuously take video or a series of snapshots and audio recording and store the recordings in a loop of a predetermined duration in the memory 153 as a local storage such that recordings older than the predetermined duration are overwritten first by new recordings. The duration may, for example, between 30 seconds and 5 minutes, between 5 and 15 minutes, or other durations selected or set by the user. The main controller 140, in order to conserve power in the basic mode, has the option to record at a reduced power setting by reducing the resolution of the images captured, reducing the frame rate of the video capture, turning off certain sensors, or any combination thereof, either at the discretion of the user, or potentially programmed into the operating system of the main controller 140.

For example, normal operation may be at 10 frames per second. When the device gets down to 20% battery or less, Basic mode reduces the frame rate to 5 frames per second or less in order to assist in extending life of the battery 155.

Emergency Mode (Protect)

The main controller 140 may be instructed to enter into Emergency mode due to an adverse event, for example, one or more of the following incidents:

the user manually triggering an emergency trigger;
the scene monitor 110 experiencing an abrupt or a violent movement signifying that the scene monitor 110 is being snatched off the user or the user is being physically attacked;
an unexpected stop of transmission of scene data from the scene monitor 110 to the main controller 140;
the user experiencing a sudden fall, or accident involving violent movement;
the scene monitor 110 experiencing/sensing recognizably threatening images, such as a fire, a weapon, a known felon;
the scene monitor 110 experiencing/sensing audible warnings in the environment, for example, a gunshot, a scream, a siren or key words spoken to trigger and emergency event; and
the scene monitor 110 experiencing/sensing certain hazardous elements in the ambient environment, such as radiation, certain particulates in the air, gas emissions, etc.

Once in Emergency mode the loop recording is stored permanently to the apparatus 100, and recording continues and is stored to the memory 153. The pre-recorded data and ongoing live data are then transmitted to the Internet or an external location.

Once successfully stored to the Internet or the external location, the memory 153 can potentially be wiped in order to save memory space.

Any friends, family or emergency services (emergency contacts) selected by the user are then notified of an event via, e.g., email, SMS or other recognized means of communication.

A web link is provided to the emergency contacts allowing them to access to the data to view and react to.

These files cannot be deleted for a time period in order to provide additional security to the user.

Protection Mode

The main controller 140 of the apparatus 100 during execution of pre-stored instructions may include an operation mode that is classified as a protection mode, for example, a personal protection mode. The personal protection mode in this example is a mode of the highest personal security level and is set to confer the maximum protection available to the user. When operating in the personal protection mode, the main controller 140 is to operate to continuously capture scene data and to transmit all or part of the captured scene data to the designated storage destination (the remote server 170) for remote data storage once a predetermined quantity of data has been collected. The predetermined quantity of data may correspond to a minimum of one or two pictures, but may be more. Since the designated storage is in the cloud 175, damage or destruction of the apparatus 100 at the locality of attack or accident would have no consequence on the remotely-stored scene data.

When a hazardous or emergency event is identified by the apparatus 100, the apparatus 100 would also transmit an emergency signal to the service provider and the service provider then follows a set of predefined protocols to assist a registered user.

When no hazardous or emergency event is detected by the apparatus 100, the stored scene data are to be deleted after a prescribed period, for example, after 72 hours of storage.

Monitoring Mode

The scene monitor 110 captures scene data and stores the scene data on the main controller 140 for safe keeping in a loop of between 30 seconds to 10 minutes. In an event of an attack or an emergency, if such emergency is detected by the apparatus 100, the apparatus 100 sends the prerecorded scene data to the Internet and continues to send additional data "Live".

Sharing Mode

The main controller 140 of the apparatus 100 during execution of pre-stored instructions of the application software may include an operation mode that is identified as the sharing mode. When operating in the sharing mode, captured scene data are stored locally in the memory 153 and are also transmitted to an external storage destination (i.e. the remote server 170) for sharing by users having access to the destination. The sharing mode in this example is a mode of the very low personal security level. A session or a sharing folder may be created at the storage destination and scene data stored at the storage destination may be shared by friends, acquaintances, family and relatives, etc.

When operating in the sharing mode, the scene data may be transmitted, for example, intermittently to the storage destination. Friends, acquaintances, family and relatives, etc. may receive alerts of notifications when new or unviewed scene data are available.

Marathon Mode

The main controller 140 of the apparatus 100 during execution of pre-stored instructions of application software may include an operation mode that is identified as the marathon mode. The marathon mode is similar to the sharing mode, except that the marathon mode is customized for a marathon event.

In the marathon mode, the main controller 140 may monitor physiological parameters of the user and to trigger a distress report when the physiological parameters indicate external distress assistance is required. The physiological parameters to be monitored may include one or more of: heart rate; blood pressure; and blood sugar level. Sensors for monitoring the aforesaid physiological parameters are included as optional accessories on the main controller 140.

In the marathon mode, the user may instruct the main controller 140 to download the marathon route and associated metrics so that the apparatus 100 may monitor the user's activities with reference to the routes and associated metrics. The metrics may include altitudes along the route, current weather, supply stations, etc.

Other Modes

The example modes are just examples to illustrate example operation of the apparatus 100. Other modes can be devised from time to time without loss of generality.

Adverse Situations and Emergency Events

The main controller 140 on execution of pre-stored instructions of the application software is to be in continuous data communication with the scene monitor 110 to receive real-time scene data. The scene data are typically transmitted in real time as electronic signals, but can be transmitted as optical, infra-red, sonic, ultra-sonic or other signals suitable for data communications without loss of generality. The main controller 140 on executing pre-stored instructions is to process and analyze the received scene data and to determine whether the received scene data correspond to an adverse situation or a non-adverse situation. The instructions of the application software are pre-stored in the memory 153 of the main controller 140 for subsequent retrieval and execution by the main controller 140 to facilitate personal safety monitoring.

If the main controller 140 after having analyzed the received scene data comes to a determination that an adverse situation is justified, or if there is a need to record evidence and store safely in the cloud 175 and/or to inform external assistance or external intervention, the main controller 140 is to generate and to transmit a distress report automatically to an external destination by machine operation. The aforementioned external destination is geographically remote from the user and the distress report may be transmitted by the main controller 140 through the transceiver 152 and by using the Internet or other wide area network, such as a public WiFi available at the scene. The apparatus 100 may be pre-set to send the distress report to a report center of a service provider. The service provider may be a platform operated by a dedicated distress relief agency, such as a law-enforcement operated call center, or by a private security enterprise operating on-line relief facilities. A distress report may comprise a distress signal signifying a safety-threatening even has occurred, a distress message comprising critical information and optionally a copy of scene data. Critical information may include a time stamp indicating the time when the distress report was sent, location of the scene, and severity of distress. The severity of distress may be classified into a plurality of distress levels and/or a plurality of distress natures according to a pre-established system to indicate the urgency of distress relief required. For example, the severity of distress in descending order of relief urgency required may be classified into:

(1) life-threatening (immediate relief required);
(2) life-threatening (relief required);
(3) safety-threatening (immediate relief required);
(4) safety-threatening (relief required); and
(5) attention required (lowest priority).

The critical information and the scene data may be sent as attachments to the distress report. It is possible that the critical information and the scene data may be sent following a distress signal of the distress report to alert the platform. The platform may be a manually operated platform or a machine-operated platform pre-trained (for example, by using AI training) to handle distress reports.

The distress report may include a protected copy of recording or clipped recording of an attack where an attack is detected or apparent. The platform on responding to the distress report may seek to establish communication with the user to seek confirmation whether the distress signal is real or false. The platform may take over control of the apparatus 100 remotely to provide emergency intervention to deter an attacker, to comfort the victim and/or to monitor the scene pending arrival of distress relief.

The main controller 140 on execution of the pre-stored instructions of the application software is capable of identifying an adverse situation based on received scene data and sending a distress report to the platform by machine operations. To facilitate identification of an adverse situation with reference to the captured scene data by machine operations, the application software includes instructions which on execution by the main controller 140 are to analyze contents of the scene data to identify whether any safety-threatening scenes constituting an adverse situation or adverse situations are embedded in the scene data, and/or to extract the safety-threatening scenes for sending off to the remote destination for distress relief and/or for preservation of evidence. The main controller 140 may extract pertinent scene data for summary assessment by the platform.

To facilitate identification of an adverse situation with reference to the captured scene data by machine operations, the application software may include instructions which on execution by the main controller 140 are to analyze image contents of the scene data and to identify distress scene images indicating safety threats. Example of distress scene images include images of weapons, body parts, fierce facial expressions, bloody scenes, fighting scenes, fire, etc.

The instructions may be formulated based on motion and/or sound detection and analyzing algorithms adapted for determining whether the scene data contain an adverse situation. The main controller 140 may be equipped with AI to recognize an adverse situation or to determine whether a situation is adverse or non-adverse.

In order for the apparatus 100 to make machine-based decisions on whether a set of received scene data corresponds to occurrence of an adverse situation, conditions to qualify a situation as an adverse situation are to be predetermined and preset in the stored instructions.

In some examples, scene situations are to be broadly classified as an adverse situation or a non-adverse situation. Scene situations may be classified as adverse, non-adverse, or neutral. An adverse situation means an unpleasant situation. A non-adverse situation means a situation in which the user is performing activities as contemplated or scheduled and without negative indications. A neutral situation is one that is intermediate between the adverse and non-adverse situations, and the user does not require external assistance or intervention.

Adverse situations may be classified into a plurality of distress levels according to the degree of severity or gravity so that appropriate levels of relief actions or measures can be implemented. For example, an adverse situation may be classified as personal-safety-threatening or non-personal-safety-threatening. A personal safety-threatening situation may be further classified as life-threatening or non-life threatening. A life-threatening adverse situation may be assigned with the highest priority or gravity level and the most urgent responses and external intervention are to be provided. The life-threatening adverse situation may further be classified as an imminently life-threatening and non-imminently life-threatening. The non-life-threatening safety-threatening adverse situation may be assigned with a priority lower than the highest priority but higher than non-safety threatening adverse situation. The non-life threatening but safety situation may further be classified as a significant or non-significant event. For example, personal injuries with no imminent danger to life is classified as a significant event, while an accidental fall with the user resuming his or her pre-fall situation within a predetermined time limit is classified as a non-significant event.

The platform may generate an automated distress report to an external destination by machine operated data communication upon detection of a safety-threatening adverse situation. The external destination may be a call center of law enforcement agencies, rescue operations and/or personal contacts of the user. A protected copy of the captured scene data may be attached with the distress report to mitigate risks of adverse tampering.

Listed below are some examples of adverse situations:
the user being attacked;
the user suffering an accidental trip or fall;
an abnormal or unexpected change in velocity of the user;
the user anticipating or foreseeing threats of personal safety;
the scene monitor 110 being disconnected during operations and the connection not resuming within a prescribed duration;
the scene monitor 110 experiencing/sensing recognizably threatening images such as a fire, a weapon, a known felon, etc.;
the scene monitor 110 experiencing/sensing audible warnings in the ambient environment, for example, a gunshot, a scream, a siren or key words spoken to trigger an emergency event; and
the scene monitor 110 experiencing/sensing certain hazardous elements in the ambient environment, such as radiation, certain particulates in the air, gas emissions, etc.

An attack can be a physical attack or a verbal attack. The physical attack may involve bodily assault that may result in bodily harm and/or injuries. The verbal attack in itself typically involves verbal abuses, but may escalate to physical violence and bodily harm and/or injuries.

Figure 2:
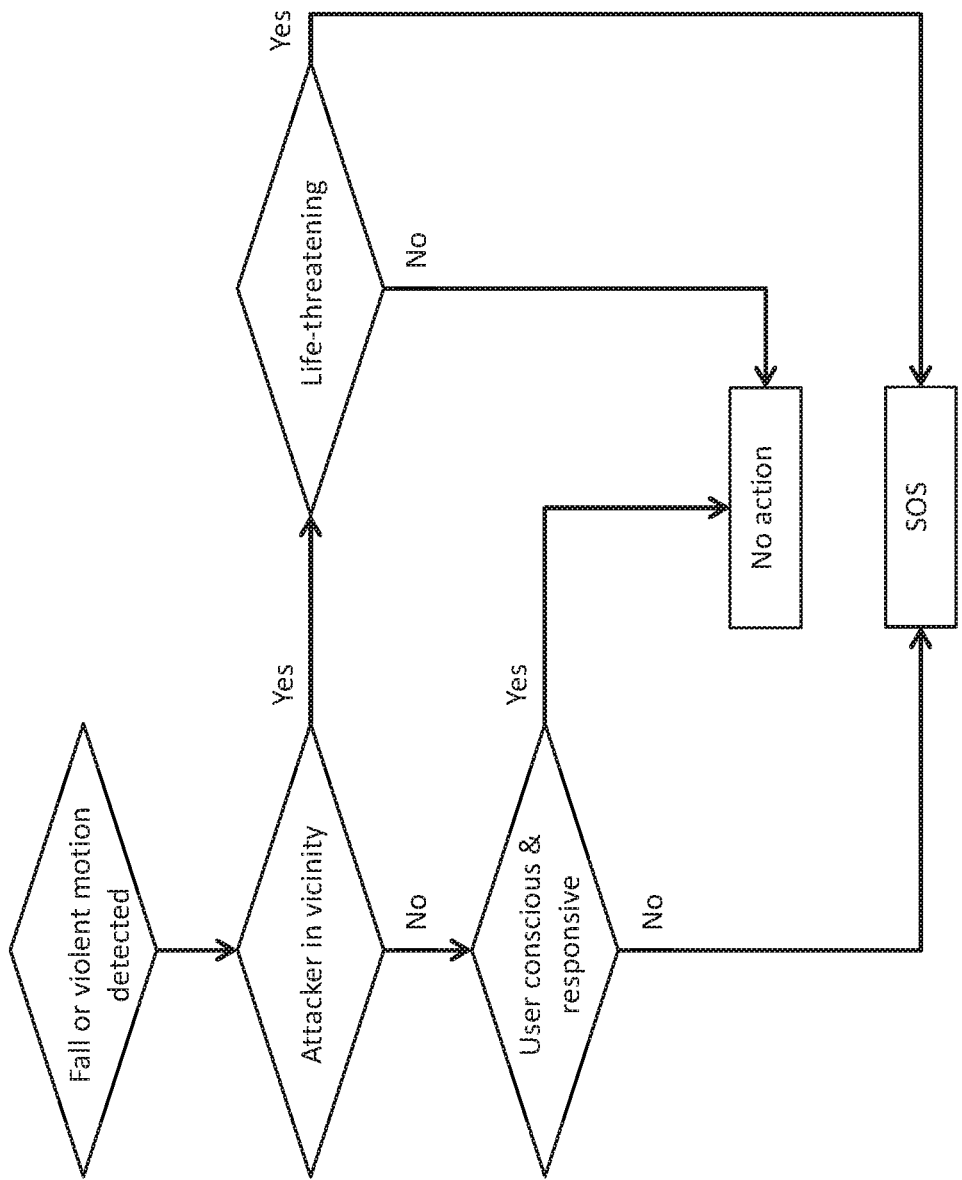
FIG. 2 depicts an example operation flow of a life-threatening intervention procedure, the procedure being adoptable by the apparatus.

In other to detect and determine whether the user is currently suffering from the physical attack, for example, being punched or hit, the scene monitor 110 may be equipped with a 3-axis accelerometer (as the motion sensor 160), and the main controller 140 is to make the determination from the captured motion data, which are part of the scene data. If a fall resembling a free fall, a violent fall or a violent movement of the user is detected, the adverse situation may correspond to a physical attack on the user or an accidental fall of the user. To distinguish between the physical attack and the accidental fall, the main controller 140 on executing stored instructions may proceed further to analyze the captured scene data to determine whether there is an attacker in the vicinity. If there is no attacker identified in the vicinity, the adverse situation may be classified as non-attack, and a non-attack procedure may be invoked by the main controller 140. If an attacker in the vicinity is identified, an attack procedure may be invoked by the main controller 140. If the user is responsive to communication requests of the platform after a falling incident is detected, indicating that the user is conscious, the platform is to continue communication with the user until a state of distress has been cleared. However, if the user is non-responsive to communication requests of the platform after a falling incident is detected, indicating that the user may be unconscious or fettered, the platform is to activate a life-threatening intervention procedure. A flow chart depicting an example operation flow of a life-threatening intervention procedure is set out in FIG. 2.

In order to determine whether an attacker is present, the application software may include a set of attacker identification instructions for analyzing captured scene data. The attacker identification instructions are to facilitate the main controller 140 to determine whether an attacker is present based on the captured scene data. The attacker identification instructions may include facial recognition instructions to identify and determine facial features and expressions of a person or animal present in the immediate vicinity of the user with reference to the video or image portions of the captured scene data. The captured scene data may be those recorded immediately before the attack, during the attack and/or after the attack. If no facial feature of an attacker is detected immediately after an attack, the platform may remotely operate the scene monitor 110 to search for possible attackers, for example, by rotating the camera 121 in all possible orientations to search for possible attacker.

To further facilitate determination of whether an attacker is present in the vicinity, the platform may make reference to sound recordings taken at the scene with reference to the audio portion of the captured scene data. For example, the operators of the platform may listen to the audio portion of the captured scene data before, during and after a falling incident to determine whether there is/was any verbal exchange indicative of abuse or violence.

The attacker identification instructions may include sound or speech recognition instructions that are to operate automatically to identify and determine whether the speech features are indicative of possible abuse and/or violence.

The attacker identification instructions may include instructions to facilitate both facial recognition and sound/voice recognition to facilitate more efficient and reliable situation determination.

A sudden, abrupt or violent change in velocity of the user while performing activities having a stipulated range of speed may be indicative of an adverse situation such as a physical attack, a car crash or other types of accidents including traffic and non-traffic accidents. The user may be inside or outside of a vehicle while involved in a traffic accident, which causes a sudden change in velocity. Whether a change in velocity of the user is an abrupt, sudden or violent change in velocity is determined with reference to the activities being undertaken. For example, if the activities being undertaken by the user are within a range of speeds or have a range of changes in speeds, a speed or a speed change exceeding a safety threshold would be classified as an abrupt or violent change. For example, if the user has been jogging at a speed of between 5 km to 10 km per hour, a sudden increase in speed to, say, 25 km is likely to indicate an adverse situation requiring external attention. If the sudden increase in speed is followed by a sudden stop, the chance that an adverse situation has occurred is very high.

The main controller 140 may include settings options for the user to input the mode of activities being taken. The setting options may include other activity parameters or metrics. Example modes of activities may include walking, jogging, running, sprinting, cycling, hiking, skiing, swimming, etc. The change in velocity may be an increase or a decrease in speed and/or a change in orientation. After the mode of activity has been set, the main controller 140 is to monitor the activity of the user and determine the average speed or velocity from time to time to set a reference to determine whether an abnormality has occurred.

The setting options of the main controller 140 may allow the user to preset a maximum value of speed. The setting options of the main controller 140 may allow the user to preset a maximum allowable rate of change of speed as a change threshold or a threshold value of change. If the maximum rate of change exceeds the change threshold, the main controller 140 is to generate a distress signal indicative of an adverse situation. The threshold value of change is a change of a threshold percentage within a prescribed duration. The prescribed duration is typically a very short duration of, say, within one to two seconds to correspond to occurrence of an adverse situation or mishap.

The application software may provide the user with an option to set a range of average speed, the maximum safety speed and/or the change threshold in percentage terms. The instructions may be AI-trained instructions to determine whether there is a sudden, abrupt or violent change in velocity.

Figure 3:
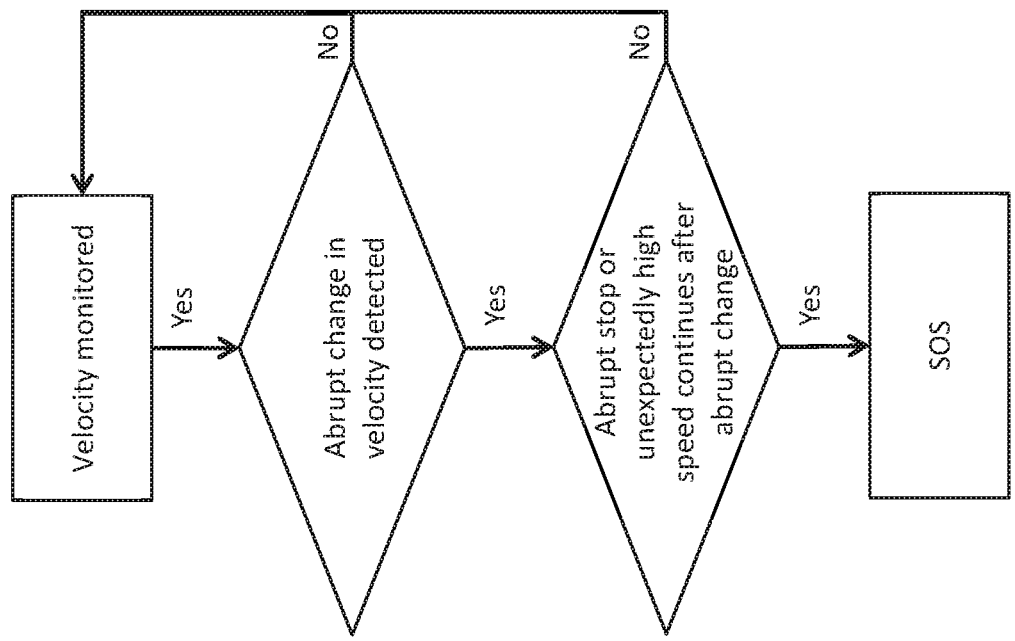
FIG. 3 depicts an example operation flow of a life-threatening intervention procedure based on speed or velocity monitoring, the procedure being adoptable by the apparatus.

When the main controller 140 has detected a sudden or abrupt change in velocity, followed by a total stop or a continuation of an exceedingly high speed, the safety procedure may be invoked by the main controller 140. A flow chart depicting an example operation flow of a life-threatening intervention procedure based on speed or velocity monitoring is set out in FIG. 3.

The application software may include instructions for detecting a series of movements and velocity changes over time so as to detect if the series of such movements and velocity changes is indicative to a non-normal behavior of the user. In case the non-normal behavior is detected, an emergency condition is triggered.

The application software may include sound recognition instructions. The main controller 140 upon execution of the sound recognition instructions would be able to identify audible signals indicative of hazards. Example audible signals indicative of hazards include fire alarms, buzzer sounds of emergency relief vehicles such as police cars, ambulance, fire trucks, etc. In general, the sound detection operation of the main controller 140 operates with other aspects of detection mechanism before deciding whether to generate and transmit distress signals to an external destination via the transceiver 152.

The application software may include pattern recognition instructions. The main controller 140 upon execution of the pattern recognition instructions would be able to identify scenes, items or article indicative of personal hazards. Gun, rifle, meat cleaver, etc., are examples of items or articles indicative of personal hazards. A scene of fire or explosion is an example of a scene indicative of personal hazards.

The application software may include hazardous environmental recognition instructions. The main controller 140 upon execution of the hazardous environmental element recognition instructions would be able to identify particulates in the environment at a level to be of personal hazard or to warn for its existence in the environment. Radiation, asbestos, illegal drugs, explosives, poisonous gas, etc. are examples of elements of personal hazards.

The application software may include a manually operable distress signal activator or generator. For example, a soft distress button (the soft distress button could be wirelessly connected to the main controller 140, providing remote control switch that could be stored in a pocket of the user) may be set on the main controller 140 or the scene monitor 110 such that the user can manually activate the main controller 140 to send a distress report to an external relief destination to invoke a life-threatening intervention procedure when danger or imminent attack is anticipated. (As one example, the soft distress button may be realized as the emergency button 162 on the main controller 140.) The platform upon receipt of the manually triggered distress report may communicate with the user, or, optionally, remotely inspect the scene through remote control of the scene monitor 110 to evaluate the immediate risks level before establishing voice communication with the user. The application software may include a silent distress mode so that the exact location of the user can be hidden and not exposed to a hostile party due to audible signals coming out of the apparatus 100.

Figure 4:
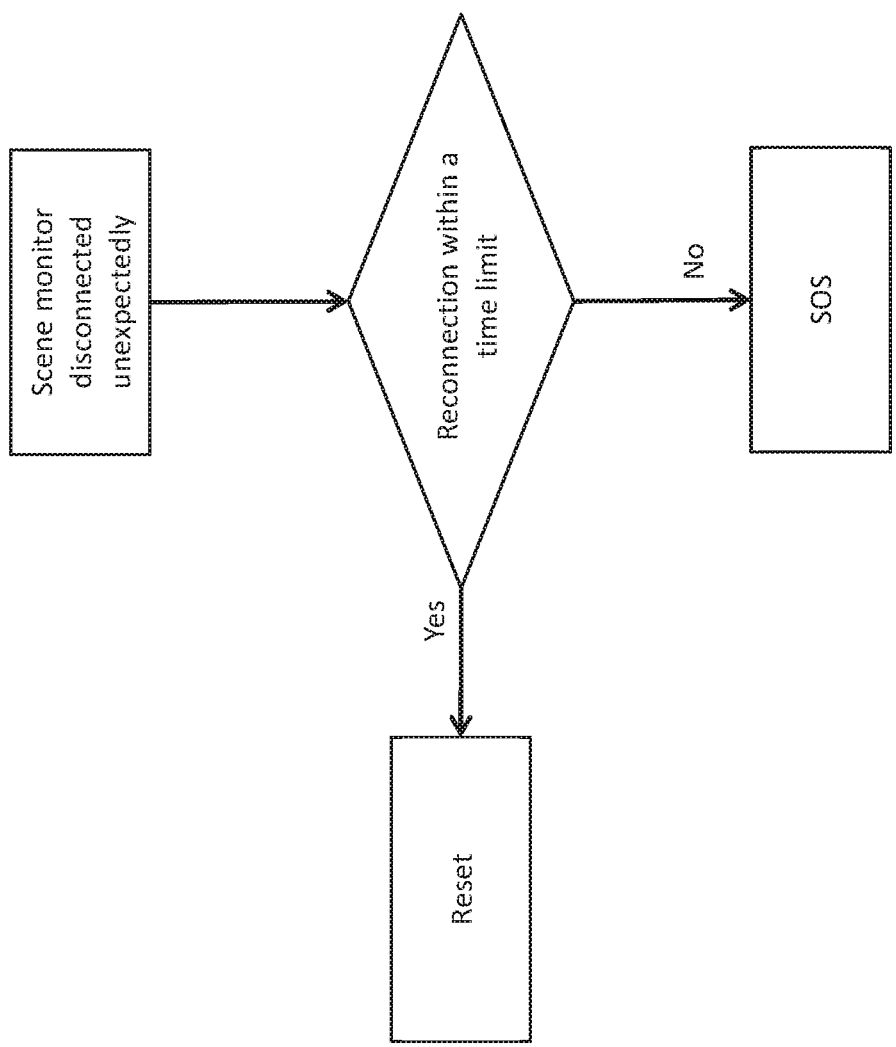
FIG. 4 depicts an example operation flow of a life-threatening intervention procedure based on disconnection, the procedure being adoptable by the apparatus.

An unexpected physical or data disconnection between the scene monitor 110 and the main controller 140 may be classified as an adverse situation or a distress event. For example, if the scene monitor 110 is disconnected from the main controller 140 without warning, the main controller 140 would classify the disconnection as an adverse situation. To mitigate the risks of false alarms, a condition could be set (but does not necessarily need to be) to see if the connection is re-established within a predetermined time after disconnection, the false alarm is to be removed and the apparatus 100 is reset to a non-distress state. A flow chart depicting an example operation flow of a life-threatening intervention procedure based on disconnection is set out in FIG. 4.

The main controller 140 may determine with reference to the captured scene data whether the scene monitor 110 has experienced an abrupt or violent movement immediately prior to the disconnection. For example, if the scene monitor 110 experiences an abrupt detachment corresponding to the scene monitor 110 being snatched off the user, the main controller 140 is to generate and transmit a life-threatening distress signal to the external destination to seek distress relief.

Figure 5:
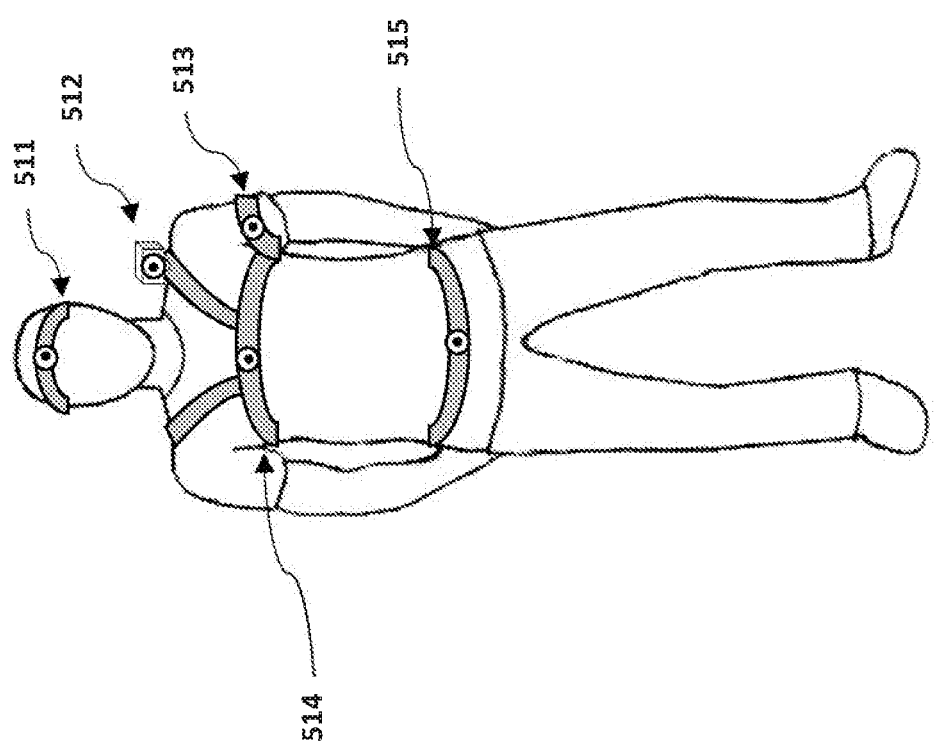
FIG. 5 depicts example locations on a user's body suitable for positioning the scene monitor.

In use, the user is to wear the scene monitor 110, as depicted in FIG. 5. The scene monitor 110 may be worn on the forehead 511, the shoulder 512, the arm 513, the chest 514 or the waist 515. The scene monitor 110 is then allowed to capture images forward of the user. The scene monitor 110 may be interchangeable depending on the user's needs, offering a broader field of view or installing with additional sensors. The scene monitor 110 may be worn on and protruding from the shoulder 512 or the forehead 511 for a 360-degree scene capture. The main controller 140 is to be carried separately from the scene monitor 110. For example, the main controller 140 may be carried in a pocket, on a waist band, attached to a ladies bra strap, around the neck via a lanyard or on an arm band distal from the scene monitor 110, or secured in a back-pack or bag. The intention is that the main controller 140 is out of view and is not as easily removed from the user as the scene monitor 110, which needs to be positioned at a location that is easily seen so that the scene monitor 110 can use the camera 121 and/or microphone 122 to "see" and "hear" what is taking place near the user. It offers greater protection to the data and provides additional time for the main controller 140 to transmit data to a secure remote location, if the user is under attack. The scene monitor 110 and the main controller 140 are connected by the cable 130, which is an insulated cable, to facilitate both data and power connection. In addition, a control apparatus in an external destination may also take over control of the scene monitor 110 remotely to conduct searches at the scene and to receive scene data that are obtained. The searches may be facilitated by changing the orientation and/or focus of the camera 121 of the scene monitor 110. The external destination may also converse with the user or persons within earshot of the apparatus 100 through a microphone and speaker arrangement. The user may also wear the scene monitor 110 to capture the scene data from rear side and/or lateral sides of the user. The scene monitor may be worn, say, on the forehead 511, the shoulder 512 and/or the waist 515 to facilitate capture of image with a 180-degree, 270-degree or 360-degree angular range. Multiple scene monitors may be worn providing different sensors. For example, a camera and a separate radiation sensor might be connected to the main controller 140.

Before the apparatus 100 is set into operational states, the user has to establish an account with the service platform for remote distress data storage as well as providing stress relief. When establishing the account, the user needs to provide his or her own personal particulars, contact information such as telephone numbers and email accounts. In addition, the user would need to provide the platform with personal particulars of an emergency contact, his or her mobile telephone number and/or email address for making emergence contacts.

After the account is registered and set up, the apparatus 100 is operational.

In example operations, the user wearing the apparatus 100 intends to venture into an area which the user is not familiar with and switch the apparatus 100 into the protection mode. While operating in the protection mode, the main controller 140 is to monitor motion of the user to record or learn the modus operandi of activity being undertaken, to record the geographical location or other metrics of the user, to continuously take scene data, and to transmit part or all of the captured scene data to the external destination or the remote server 170. The geographic location data may be obtained by means of GPS either locally on the apparatus 100 or via an associated smartphone (e.g., the mobile computing device 172) or with reference to identity of the instantaneous cell-phone station in connection with the main controller 140. In an example scenario, the user experiences an accidental fall and the accidental fall is detected by the main controller 140 on analyzing motion data received from the motion sensor 160. Upon detection of the accidental fall, the main controller 140 is to enter into a reporting mode and immediately stores the looped data to the main memory as well as ready to trigger a distress report. The user after the accidental fall resumes its pre-fall posture and activity within a pre-determined guarding period, say, 3 to 5 seconds, and the main controller 140 resets itself, removes the saved data from the memory 153 and places itself into a standby-mode to continue operation, on the protection mode. Alternatively, the main controller 140 is to reset itself into a standby-mode if the user operates the main controller 140 to send a cancel instruction to indicate that the alarm was false alarm. The cancel instruction may require a cancellation code. If the user fails to resume its pre-fall posture or activity or fails to send the cancel instruction within the guarding period, the main controller 140 is to send a distress report and/or all or part of the stored data from the time preceding the incident to the platform. In response, the platform is to attempt to establish communication with the user to confirm whether an adverse situation has occurred. Cancel an emergency event via a smartphone app. If no comforting communication is received from the user, the platform can invoke the life-threatening relief procedure.

In an example scenario, the user is in an area, feels a danger or anticipates an attack. The user triggers a manual emergency button 162 on the main controller 140 to invoke the life-threatening relief procedure. The data previously stored in a loop are then saved to a permanent memory (in the memory 153) of the main controller 140 and then attempts though wireless connection to the Internet (Smartphone hotspot, WiFi, its own cellular connection, etc.) is sent to the cloud service for safe keeping. If no connection is available at the time, the main controller 140 can continue to record data and store the data in the memory 153 until such time as a connection is re-established. Then the main controller 140 uploads the stored data to the Internet for safe keeping.

In example operations, the user is in a sharing mood and sets the apparatus 100 in the sharing mode so that activity scenes can be shared by people through the Internet. When the apparatus 100 is in the sharing mode, the apparatus 100 is to record scene data in a loop and the scene data are kept in the memory 153 of the apparatus 100. The loop time can be set by the user so that scene data older than the loop time are erased or overwritten by new scene data and scene data newer than the loop time are kept. To facilitate sharing, the main controller 140 is to transmit intermittent images or video clips to a sharing platform, for example, a sharing platform of a social media, so that people having access to the sharing platform will be able to view the images or video clips through Internet access. While in the sharing mode, the basic operation mode is also operating in the background and the main controller 140 triggers a distress report if an adverse situation is detected.

In example operations, the user is in a marathon race and sets the apparatus 100 in the marathon mode. When the apparatus 100 is in the marathon mode, the user may elect to have the main controller 140 operating in the sharing mode to broadcast race conditions. In addition, the main controller 140 is to monitor physiological performance of the user and to generate a distress report to local rescue operations when signs of distress are detected and the user needs external assistance. While in the marathon mode, the main controller 140 is to operate the basic mode in the background.

The user may use the apparatus 100 with a smart phone (also referenced as 172 for simplicity). In example operations, the main controller 140 is to transmit scene data to the smartphone 172, which is to function as a hotspot, and the smartphone 172 is to configure the main controller 140 by means of, e.g., BLE protocol. Scene data are transmitted from the main controller 140 to the smartphone 172 and then to the computing cloud 175 as an external destination for data storage. When a platform needs to take over control of the scene monitor 110, the platform may send data and/or instructions to the smartphone 172, and the smartphone 172 is to send control commands to the scene monitor 110 to perform scene data collection. The platform may send data and/or instructions to the main controller 140, with the smartphone 172 functioning as a data communication hotspot. The smartphone 172 only performs a function of relaying messages between the main controller 140 and the computing cloud 175. However, the hotspot connection enabled by the smartphone 172 does allow the smartphone 172 and the main controller 140 to communicate together when needed, for example, sending instructions and settings, starting and stopping recording, reporting emergency events, etc.

While the present disclosure has been described with reference to example embodiments, example processes and example modes, the examples are for ease of understanding of the present disclosure and are not intended as limiting examples.

What is claimed is:

1. A mobile personal-safety apparatus wearable by a user, the apparatus comprising:
one or more scene monitor for sensing an ambient environment of the user to yield scene data; and
a main controller for controlling the scene monitor and processing the scene data received therefrom, wherein the main controller comprises a transceiver for performing wireless communication, and a processor configured to:
detect occurrence of an emergency condition adverse to the user; and
responsive to detecting occurrence of the emergency condition, configure the transceiver to automatically transmit a first plurality of scene data most-recently obtained over a predetermined length of time, to a remote server for securely storing the first plurality of scene data in the remote server for future use, wherein the first plurality of scene data is before the occurrence of the emergency conditions; and
a power button for enabling the user to manually switch on and off the apparatus; and the processor is further configured to: responsive to detecting occurrence of the emergency condition, temporarily inactivate the power button to disable switching off the apparatus at least until the processor receives a message from the remote server that the remote server has successfully received the first plurality of scene data, thereby hindering an attacker who attacks the user from forcibly stopping transmission of the first plurality of scene data to the remote server;
responsive to detecting occurrence of the emergency condition, configure the transceiver to transmit a second plurality of scene data obtained after the emergency condition is detected for securely storing the second plurality of scene data in the remote server for future uses even if the apparatus is subsequently tampered or damaged.

2. The apparatus of claim 1, further comprising a motion sensor for detecting motion of the user to yield motion data, wherein the processor is further configured to:
process the motion data to determine whether a violent movement signifying the user facing a physical attack or an accident has occurred in order to detect occurrence of the emergency condition; and
responsive to detecting occurrence of the violent movement, identify that the emergency condition has occurred, thereby causing a transmission of the first plurality of scene data to the remote server to be automatically initiated without a need for the user to initiate the transmission.

3. The apparatus of claim 1, wherein the scene monitor comprises a camera for capturing images and/or video of the ambient environment, the scene data including the captured images or videos.

4. The apparatus of claim 3, wherein the processor is further configured to:
process the captured images to determine whether a predetermined object/person is present in the ambient environment in order to detect occurrence of the emergency condition; and
responsive to detecting presence of the predetermined hazardous object/person, identify that the emergency condition has occurred, thereby causing a transmission of the first plurality of scene data to the remote server to be automatically initiated without a need for the user to initiate the transmission.

5. The apparatus of claim 4, wherein the predetermined hazardous object/person is selected from a fire, one or more predetermined types of weapon, one or more known felons, and individuals who are considered dangerous to the user.

6. The apparatus of claim 1, wherein the processor is further configured to: in an absence of the emergency condition being detected, control the camera to periodically capture still images of the ambient environment; responsive to detecting occurrence of the emergency condition, control the camera to take a video, or a series of snap shots, of the ambient environment in real time; and configure the transceiver to transmit the video or the series of snap shots to the remote server for securely storing the video in the remote server for future uses even if the apparatus is subsequently tampered or damaged.

7. The apparatus of claim 1, wherein
the scene monitor comprises a microphone for capturing audio signals originated from the ambient environment, the scene data including the captured audio signals and further process the captured audio signals to determine whether a predetermined danger-indicative sound segment is present in the ambient environment in order to detect occurrence of the emergency condition; and
responsive to detecting presence of the predetermined danger-indicative sound segment, identify that the emergency condition has occurred, thereby causing a transmission of the first plurality of scene data to the remote server to be automatically initiated without a need for the user to initiate the transmission.

8. The apparatus of claim 1, wherein the processor is further configured to:
detect when the scene monitor is detached from the main controller provided an unexpected stop of transmission of the scene data from the scene monitor to the main controller in order to detect occurrence of the emergency condition; and responsive to detecting the unexpected stop of scene-data transmission, identify that the emergency condition has occurred, thereby causing a transmission of the first plurality of scene data to the remote server to be automatically initiated without a need for the user to initiate the transmission.

9. The apparatus of claim 1, wherein: the scene monitor comprises a hazardous-gas sensor for measuring a concentration of a predetermined hazardous gas to yield hazardous-gas concentration data; and the processor is further configured to process the hazardous-gas concentration data to detect occurrence of the emergency condition, whereby occurrence of the emergency condition being detected causes a transmission of the first plurality of scene data to the remote server to be automatically initiated without a need for the user to initiate the transmission.

10. The apparatus of claim 1, wherein: the scene monitor further comprises a particulate matter (PM) measurement sensor for measuring a concentration of PM to yield PM concentration data; and the processor is further configured to process the PM concentration data to detect occurrence of the emergency condition, whereby occurrence of the emergency condition being detected causes a transmission of the first plurality of scene data to the remote server to be automatically initiated without a need for the user to initiate the transmission.

11. The apparatus of claim 1, wherein: the scene monitor further comprises an ionizing radiation sensor for measuring radiation power of ionizing radiation to yield radiation-power data; and the processor is further configured to process the radiation-power data to detect occurrence of the emergency condition, whereby occurrence of the emergency condition being detected causes a transmission of the first plurality of scene data to the remote server to be automatically initiated without a need for the user to initiate the transmission.

12. The apparatus of claim 1, wherein the scene monitor or the main controller comprises a Global Position System (GPS) tracking unit for identifying a location of the apparatus to yield location data and to transmit the location information to the remote server.

13. The apparatus of claim 1, wherein the transceiver is configured to at least support Wi-Fi or one or more terrestrial mobile communication protocols or LTE or Bluetooth Low Energy (BLE) or connection via hotspot or via a wireless channel with a mobile computing device for providing wireless connectivity with the remote server.

14. The apparatus of claim 1, further comprising:
an emergency button for enabling the user to manually inform the processor that the emergency condition has occurred.

15. The apparatus of claim 1 further comprising: a cable connecting the scene monitor and the main controller for at least enabling the scene monitor and the main controller to communicate, allowing the scene monitor to be exposed outside a garment of the user for sensing the ambient environment while the main controller is concealed inside the garment to thereby hinder an attacker who attacks the user from forcibly taking hold of the main controller.

16. The apparatus of claim 1, wherein: the main controller further comprises a memory for storing the location and scene data and further comprises a battery holder for accommodating a battery; and the cable is configured to transmit electrical power from the battery to the scene monitor for powering the scene monitor.

17. The apparatus of claim 1 further comprising: an attachment device attached to the scene monitor for detachably attaching the scene monitor to a garment of the user.

18. The apparatus of claim 1, wherein the processor is further configured to: configure the transceiver to communicate with a mobile computing device for receiving commands therefrom; and execute the received commands.

* * * * *